(12) United States Patent
Hoover (10) Patent No.: US 10,868,397 B1
(45) Date of Patent: Dec. 15, 2020

(54) SELECTIVELY CONFIGURABLE POWER AND DATA CONDUIT

(71) Applicant: Hoover Panel Systems, Inc., Rockwell, TX (US)

(72) Inventor: Alex Hoover, Rockwell, TX (US)

(73) Assignee: Hoover Panel Systems, Inc., Rockwell, TX (US)

( * ) Notice: Subject to any disclaimer, the term of this patent is extended or adjusted under 35 U.S.C. 154(b) by 0 days.

(21) Appl. No.: 16/374,627

(22) Filed: Apr. 3, 2019

Related U.S. Application Data (60) Provisional application No. 62/652,497, filed on Apr. 4, 2018.

(51) Int. Cl.
  *H01R 4/60* (2006.01)
  *H01R 25/00* (2006.01)
  *H04B 1/04* (2006.01)

(52) U.S. Cl.
  CPC .......... *H01R 25/006* (2013.01); *H04B 1/0475* (2013.01)

(58) Field of Classification Search
  CPC ........ H02G 3/288; H02G 15/076; H02G 3/20; H01R 25/006; E04B 2/825; E04B 2/7425
  USPC .................... 439/215, 535, 538; 174/60, 61; 52/238.1, 239
  See application file for complete search history.

(56) References Cited

U.S. PATENT DOCUMENTS

| | | | | |
|---|---|---|---|---|
| 5,209,035 A | * | 5/1993 | Hodges | E04B 2/7425 52/220.7 |
| 5,347,778 A | * | 9/1994 | Bray | E04B 2/7425 160/135 |
| 5,852,904 A | * | 12/1998 | Yu | E04B 2/7422 52/220.7 |
| 6,223,478 B1 | * | 5/2001 | Wheeler | E04B 2/7433 52/220.7 |
| 6,282,854 B1 | | 9/2001 | Vos et al. | |
| 6,374,548 B1 | | 4/2002 | Ruedinger et al. | |
| 6,748,710 B2 | * | 6/2004 | Gresham | E04B 2/7425 52/242 |
| 6,865,853 B2 | * | 3/2005 | Burken | E04B 2/7422 160/135 |
| 6,920,727 B2 | * | 7/2005 | Yu | E04B 2/7433 403/363 |
| 6,944,993 B1 | * | 9/2005 | Jilk | E04B 2/7422 160/351 |
| 6,964,138 B2 | * | 11/2005 | Carroll | E04B 2/7425 52/127.5 |
| 8,015,767 B2 | * | 9/2011 | Glick | E04B 2/7425 52/239 |
| 8,024,901 B2 | * | 9/2011 | Gosling | E04B 2/7424 52/238.1 |
| 8,402,699 B2 | * | 3/2013 | Henriott | E06B 3/46 49/410 |
| 8,925,619 B2 | * | 1/2015 | Frezouls | E04B 2/7433 160/135 |

* cited by examiner

*Primary Examiner* — Thanh Tam T Le
(74) *Attorney, Agent, or Firm* — FisherBroyles, LLP; Craig W. Mueller (57) ABSTRACT

A system for providing power, voice, and/or data capabilities to a work environment. More specifically, a modular system having at least two conduits is provided that is suited for open floor plan environments. The conduits are configured to accomodate cables of differing character to reduce or eliminate electromagnetic interference.

17 Claims, 12 Drawing Sheets

SELECTIVELY CONFIGURABLE POWER AND DATA CONDUIT

This application claims the benefit of U.S. Provisional Patent Application Ser. No. 62/652,497, filed Apr. 4, 2018, the entirety of which is incorporated by reference herein.

FIELD OF THE INVENTION

Embodiments of the present invention are generally directed to systems configured to deliver power, communication, and data interfaces to at least one user.

SUMMARY OF THE INVENTION

Work stations in many office buildings comprise a plurality of interconnected cubicles that accommodate at least one employee. Cubicles are generally constructed of 4 to 6-foot walls that provide some privacy. The cubical walls include integrated conduits for power and voice/data cables that may terminate at one or more user interfaces. Many office buildings are abandoning cubicles in favor of an "open" floor design, wherein a plurality of desks are positioned in an array without barriers, i.e., walls, therebetween. An open office concept still requires power, voice, and data interconnectivity, and providing required cables to each workspace in a non-concealed manner creates dangerous obstacles to foot traffic. Accordingly, there is a need to provide power, voice, and data functionality to workspaces in an open office that does not employ walls or other structures that normally accommodate cable conduits.

One embodiment of the present invention is a power and data conduit system designed to function an open office environment. The power and data conduit system contemplated herein comprises a first portion configured to accommodate electrical cables that provide power to at least one workspace. A second portion is selectively interconnected to the first portion and configured to carry voice/data cables. Spacing the power cables from the voice/data cables will reduce or omit the need for voice/data cable shielding. More specifically, one of ordinary skill in the art will appreciate electromagnetic interference from power cables can reduce voice/data cable effectivity, so power cables and voice/data cables positioned in close proximity should be electromagnetically shielded from each other. In one embodiment of the present invention, the space between the power and voice/data cables is adequate and interference is reduced. In another embodiment, a barrier is provided between the power conduit and the voice/data conduit that shields the voice/data cables from electromagnetic interference from the power cables.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. Other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken with the drawings.

DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

The following component list and associated numbering found in the drawings is provided to assist in the understanding of one embodiment of the present invention:

\# Component
2 Power and data conduit system
6 Rail assembly
10 Post
14 Power rail
18 Data conduit
22 Outlet
26 Voice/data connector
30 Foot
34 Base portion
38 Bracket
42 Upper plate
48 Opening
52 Front plate
54 Opening
56 End plate
60 Opening
\#Component
64 Rail connector
68 Groove 72 Longitudinal wall
76 Upper edge
80 Clip
84 Opening
88 Mounting bracket
92 Groove
96 Hook
100 Bottom surface
104 Fastener
108 Post portion
120 First plate
124 Proximal end
130 Distal end
134 Second plate
138 Proximal end
140 Distal end
144 Arcuate member
150 Junction
154 Finger
160 Extent
164 Face
168 Face
172 Stop
176 Seat
200 Planar surface
204 Tendon
208 Rail
212 Outer wall
Component
216 Sidewall It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

Figure 2:
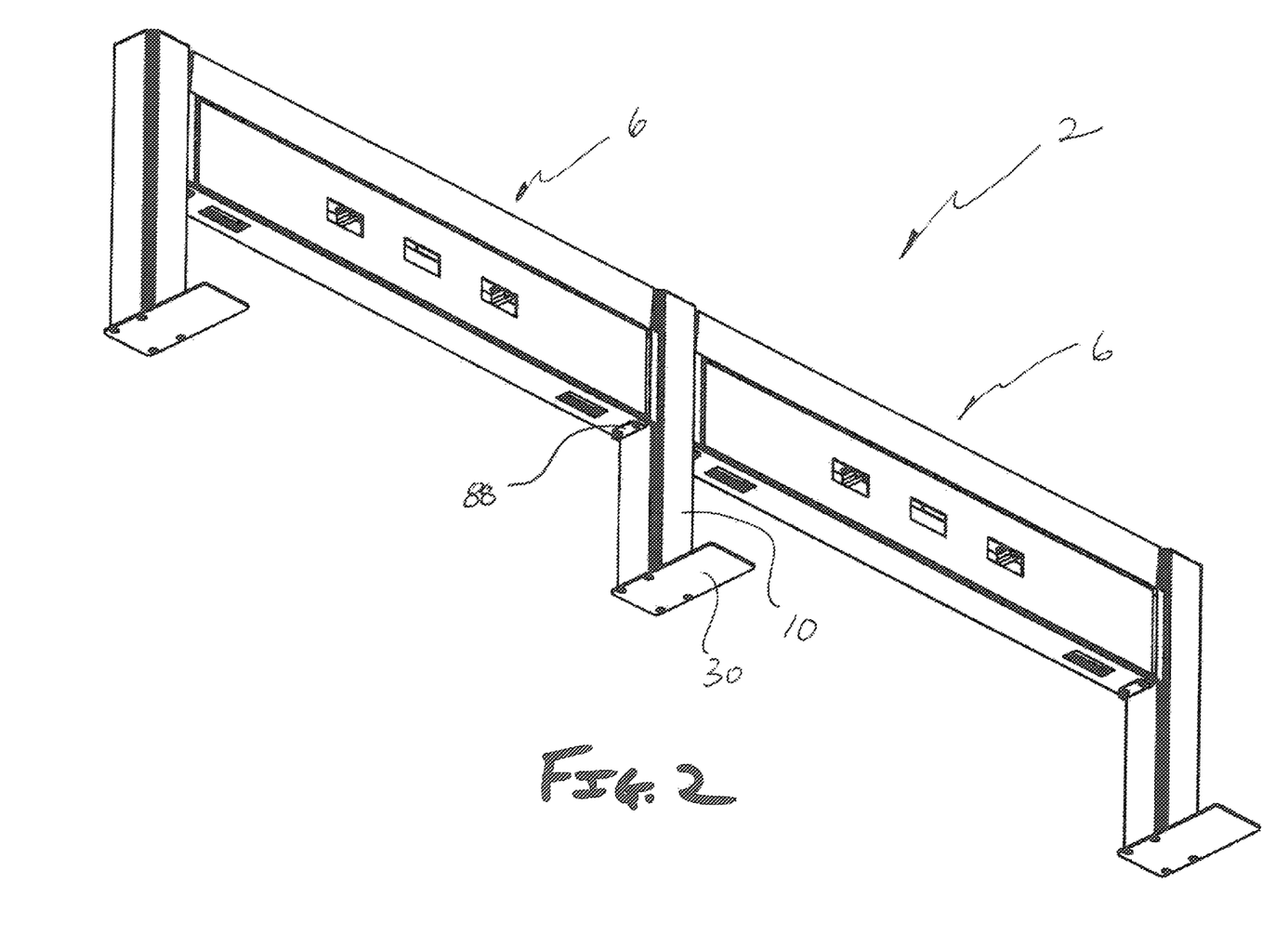
FIG. 2 is a rear perspective view of the embodiment shown in FIG. 1.
Figure 3:
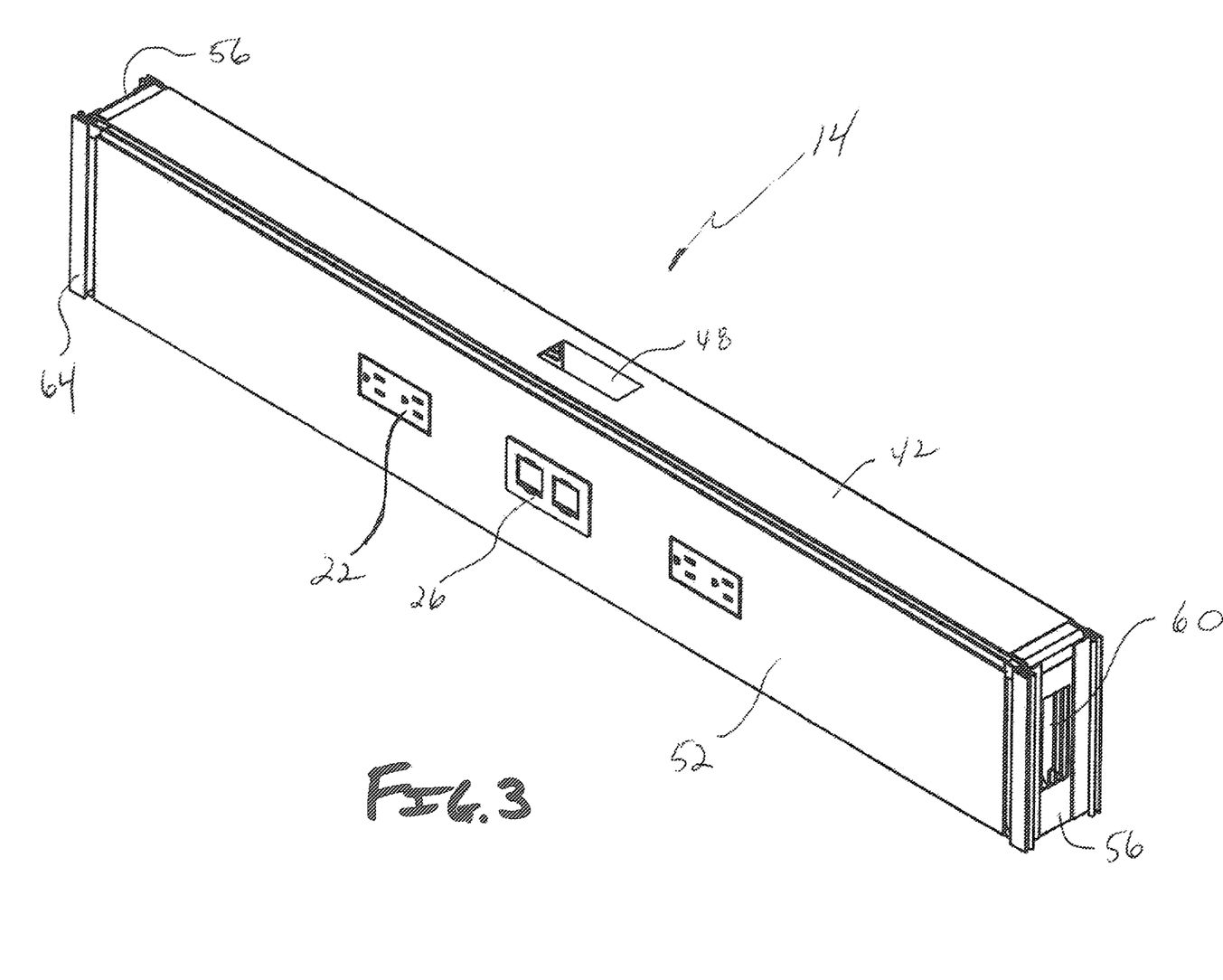
FIG. 3 is a front perspective view of a power rail of one embodiment of the present invention.
Figure 4:
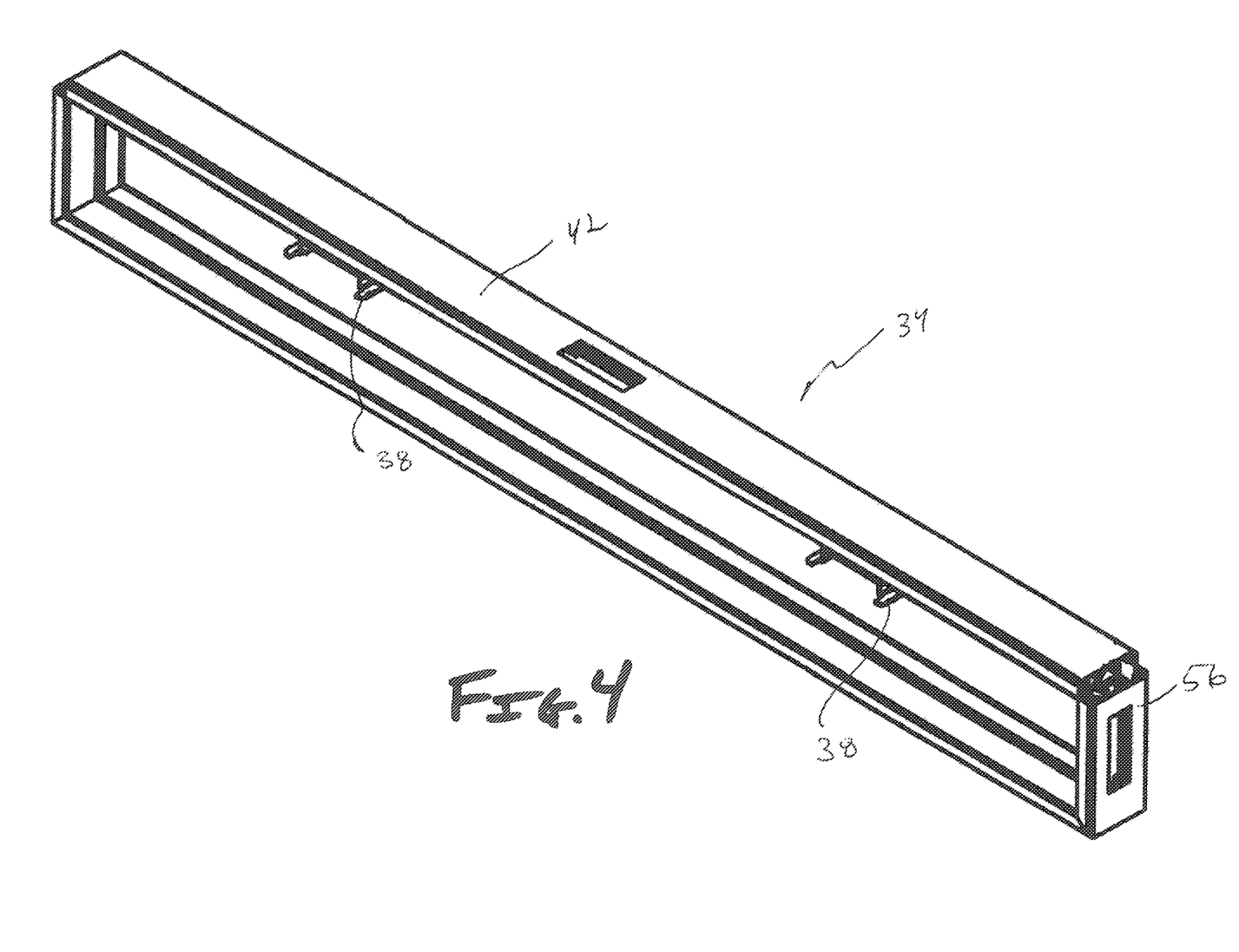
FIG. 4 is a front perspective view showing a base portion of the power rail shown in FIG. 3.
Figure 5:
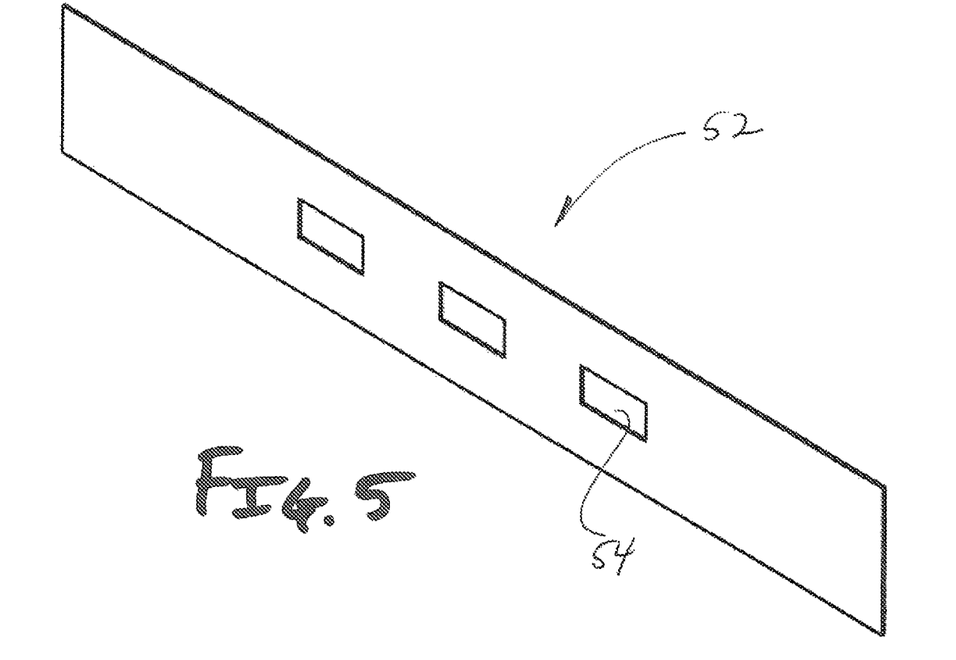
FIG. 5 is a front plate that selectively interconnects to the base portion shown in FIG. 4.
Figure 6:
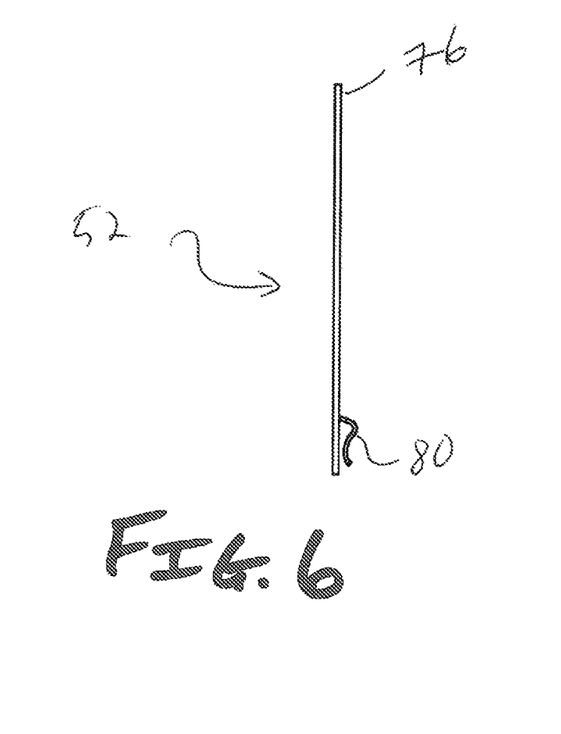
FIG. 6 is a side elevation view of FIG. 5.

FIGS. 1-16 show the power and data conduit system 2 of some embodiments of the present invention that generally includes a plurality of rail assemblies 6 interconnected to posts 10 that rest on a floor. The rail assemblies 6 comprise a power rail 14, i.e., electrical cable conduit, interconnected to data conduit 18, i.e., conduit for carrying voice/data cables. The power rail 14 is shown in FIG. 3 and a data conduit 18 is shown in FIG. 16. As briefly mentioned above, cables running through the power rail 14 are separated from voice/data cables running through the data conduit 18, which may omit the need to provide shielding between cable types.

Figure 1:
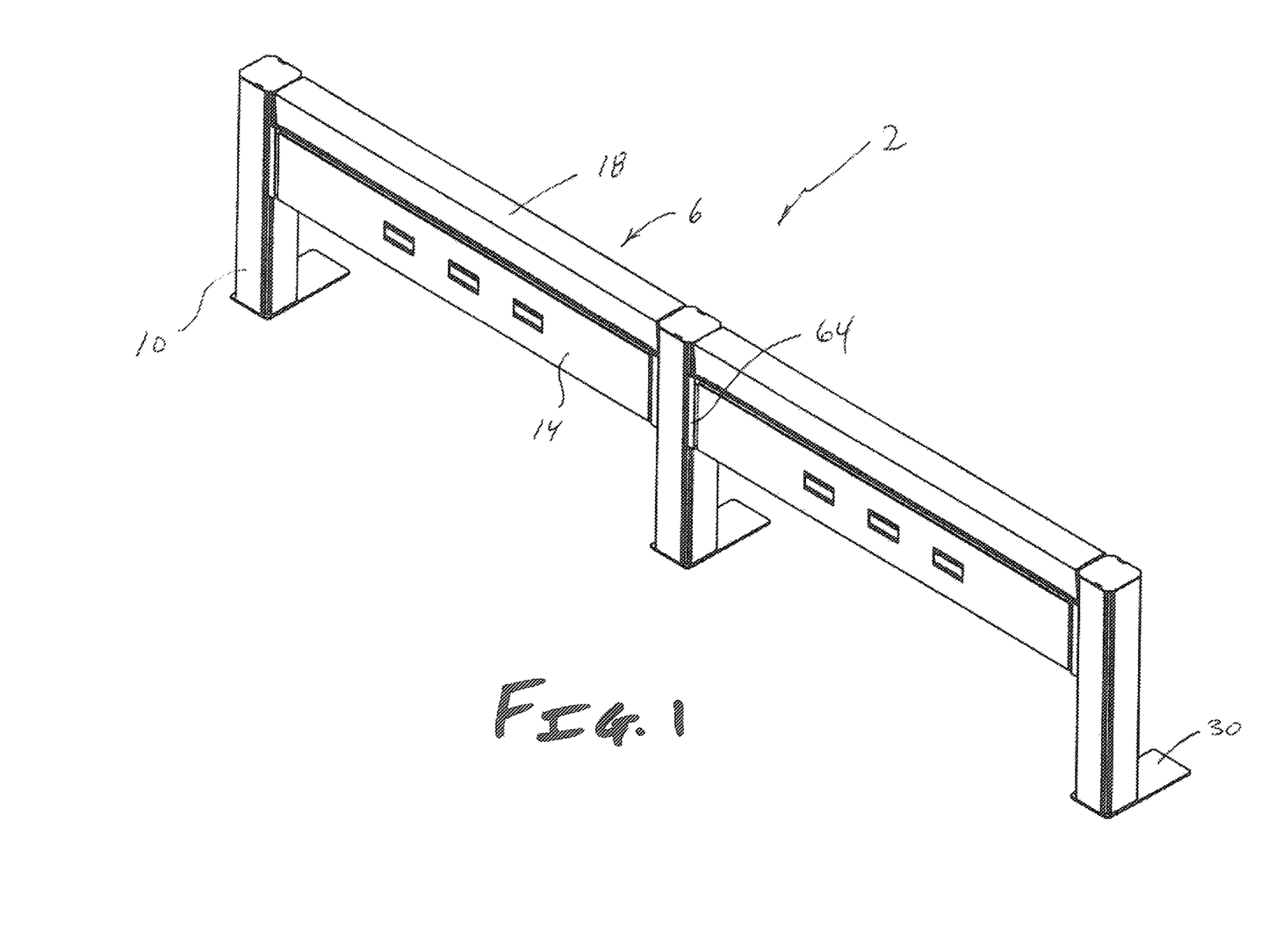
FIG. 1 is a front perspective view of a power and data conduit system of one embodiment of the present invention.

The posts 10 space the rail assemblies 6 from the floor, which may be necessary for American's with Disabilities Act (ADA) or building code compliance. Stated differently, rail assemblies 6 are positioned in such a way to locate integrated outlets 22 and voice/data connectors 26 at a predetermined height above the floor 2 facilitate access thereto. The posts 10 may be of any length and, in one embodiment, are of such length to locate the electrical outlets 22 and voice/data connectors 26 near a top surface of a desk as traditionally done. The posts 10 may engage the floor with a foot 30. Although FIGS. 1 and 2 show two rail assemblies 6 interconnected to three posts 10, one of ordinary skill in the art will appreciate that any number of rail assemblies posts can be provided without departing from the scope of the invention. In addition, rail assemblies can be interconnected to the post to provide a 90° rail assembly configuration, or posts may accept a plurality of rail assemblies that emanate radially and a hub configuration.

FIGS. 3-8 s show the power rail 14 of one embodiment of the present invention comprised of a base portion 34 that accommodates at least one bracket 38 for power outlets or voice/data connectors. An upper plate 42 of the base portion shown in FIG. 7 has at least one opening 48 that receives voice/data cables that connect with the voice/data connectors 26 integrated into a front plate 52 that selectively interconnects to the base portion 34. The front plate has openings 54 for the outlets and connectors. End plates 56 interconnected to the base portion 34 also include at least one opening 60 that receives a power cable, thereby allowing power cables to span a plurality of power rails 14. The ends of the power rails selectively receive rail connector 64 (see FIG. 15) that are configured to selectively interconnect the power rails to the end plates 56. The rail connectors are selectively received into grooves in the posts, which will be described in further detail below.

Figure 7:
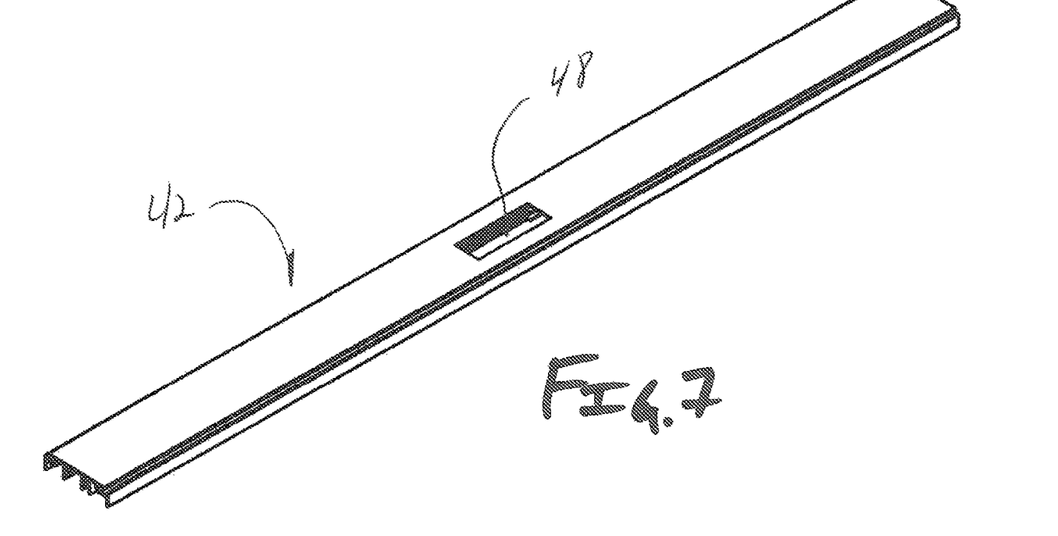
FIG. 7 is a perspective view of an upper portion shown in FIG. 4.
Figure 8:
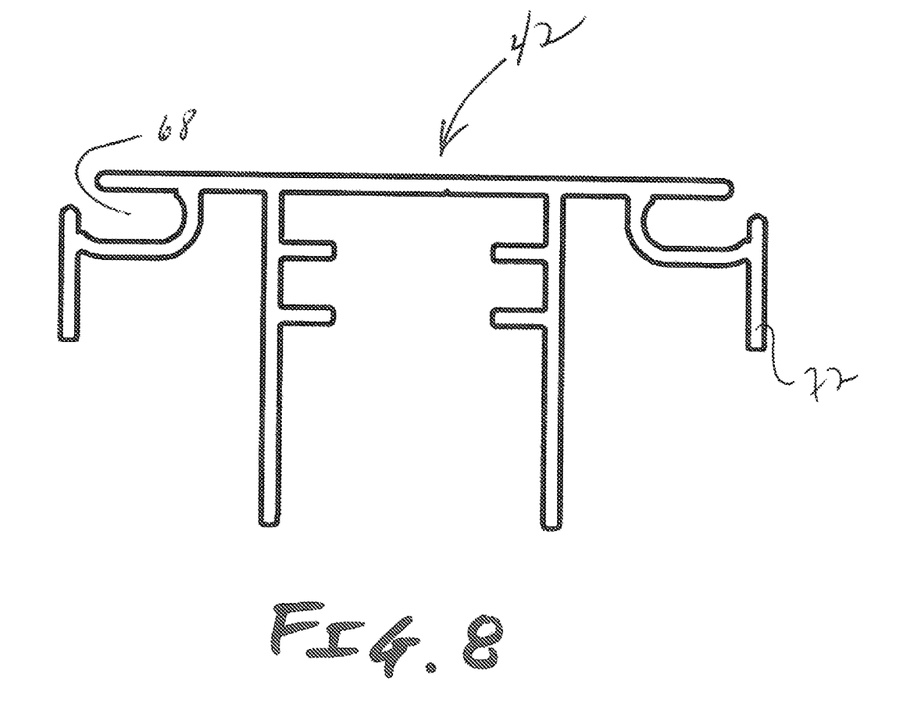
FIG. 8 is a side elevation view FIG. 7.

FIG. 7 shows the upper plate 42 of one embodiment of the present invention that includes the opening 48 that receives voice/data cables that thereafter enter the internal volume of the base portion. The profile of the upper plate 42 is shown in FIG. 8 provide stability and has grooves 68 that extend along its longitudinal axis. The grooves are configured to receive sidewalls of the data conduit. A longitudinal wall 72 constrains an upper edge 76 of the front plate, wherein the front plate's lower edge is secured by at least one clip 80. As in most other components shown herein, the upper plate is made in an extrusion process.

FIGS. 9-14 show the post 10 of one embodiment of the present invention. The post 10 provides support to the power rail and interconnected data rail and, in this example, possesses a generally square profile. As mentioned above, the rails have at least one opening that allow the power cables to extend from one rail assembly to the next. Thus, the posts you which the rail assemblies interconnect have at least one opening 84.

Figure 9:
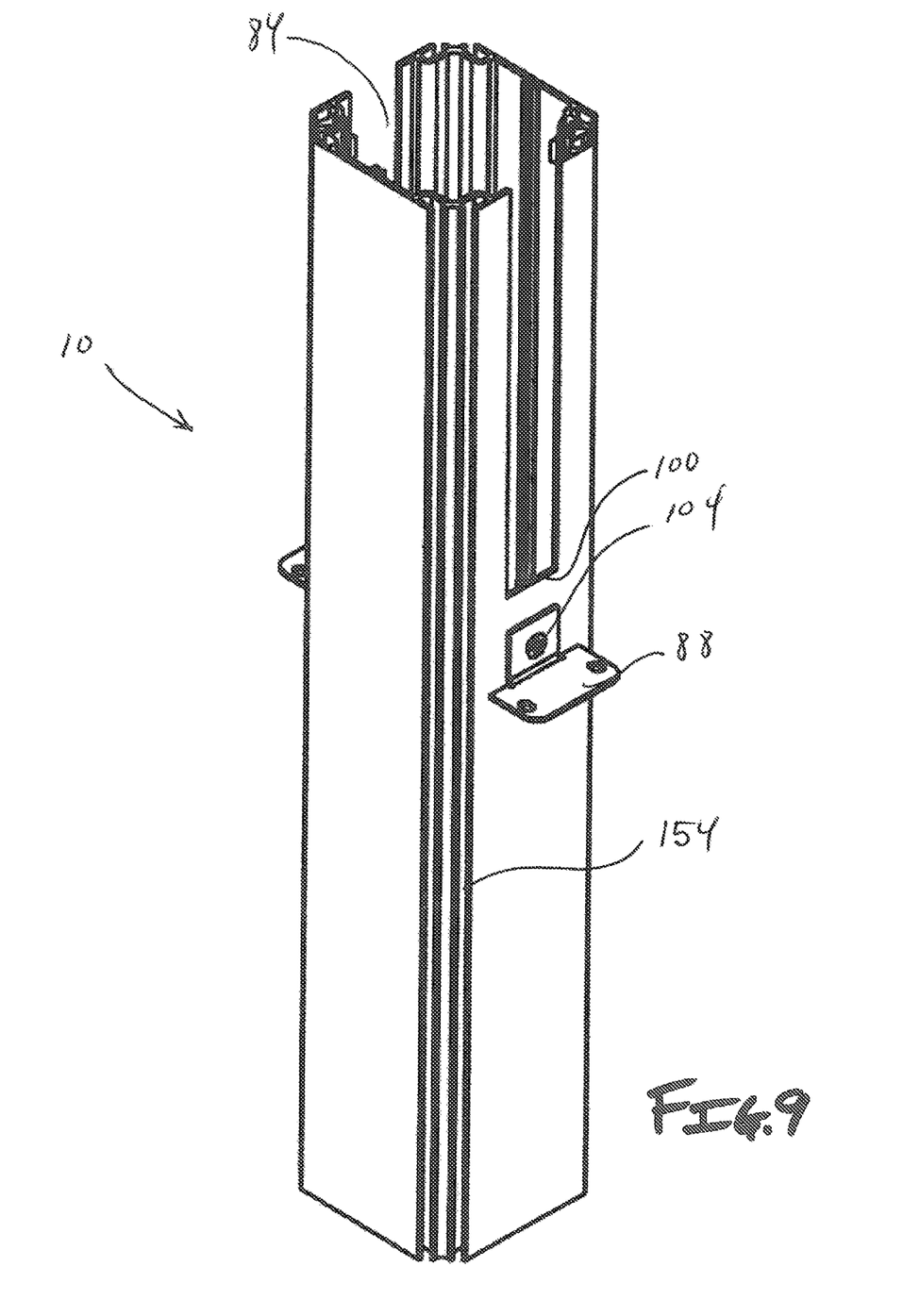
FIG. 9 is a perspective view of a post employed by some embodiments of the present invention.
Figure 10:
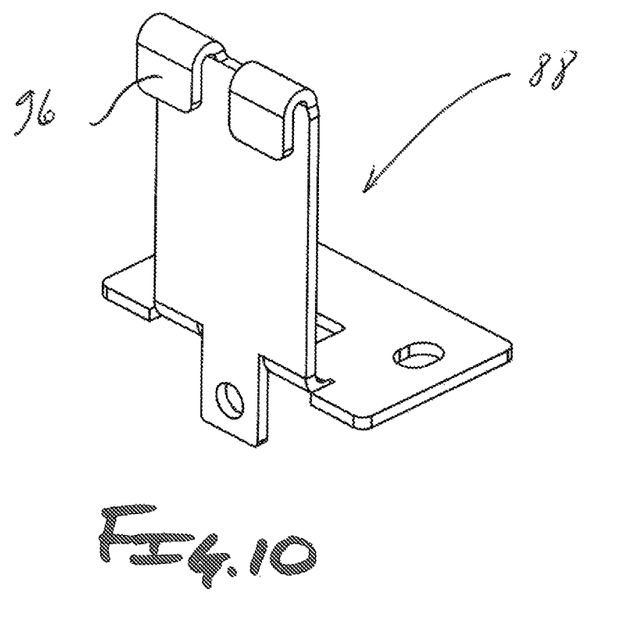
FIG. 10 is a mounting bracket configured to support the power rail of FIG. 3 onto the post of FIG. 9.

The posts 10 include at least one mounting bracket 88 located a predetermined distance above the floor. In one embodiment, the mounting bracket 88 is positioned so as to support the bottom surface of the rail assembly about 18 inches from the floor. Posts 10 also include a plurality of longitudinal grooves 92 adapted to receive rail connectors, which will be described in further detail below. FIG. 9 shows a mounting bracket 88 of one embodiment of the present invention. An alternative running bracket is shown in FIG. 10 that has hooks 96 that engage with a bottom surface 100 of the opening 84. In this example, fasteners 104 may be omitted.

Figure 11:
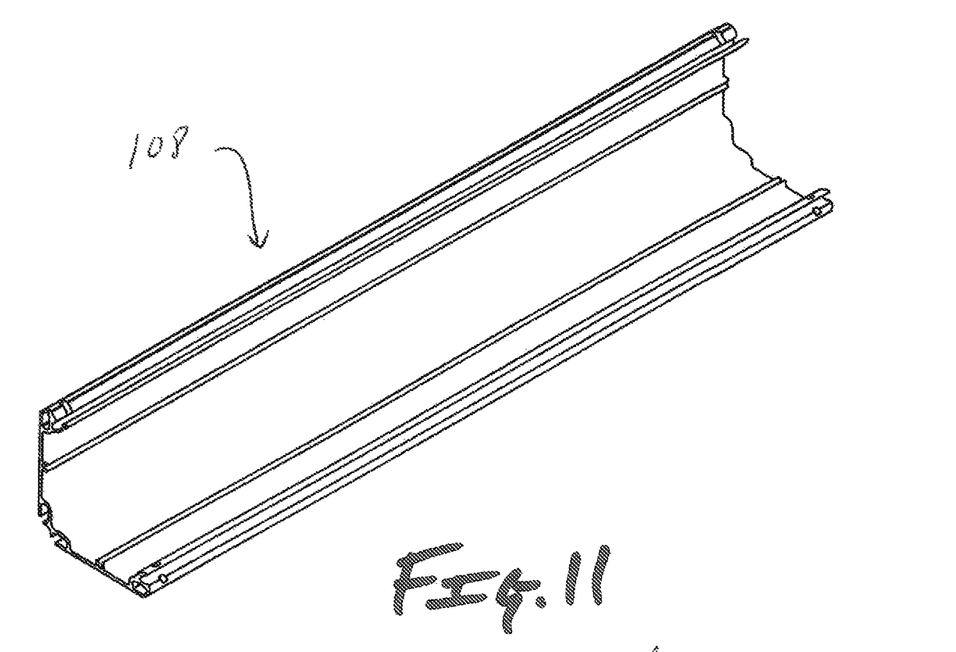
FIG. 11 is a perspective view of a portion of the post shown in FIG. 9.
Figure 12:
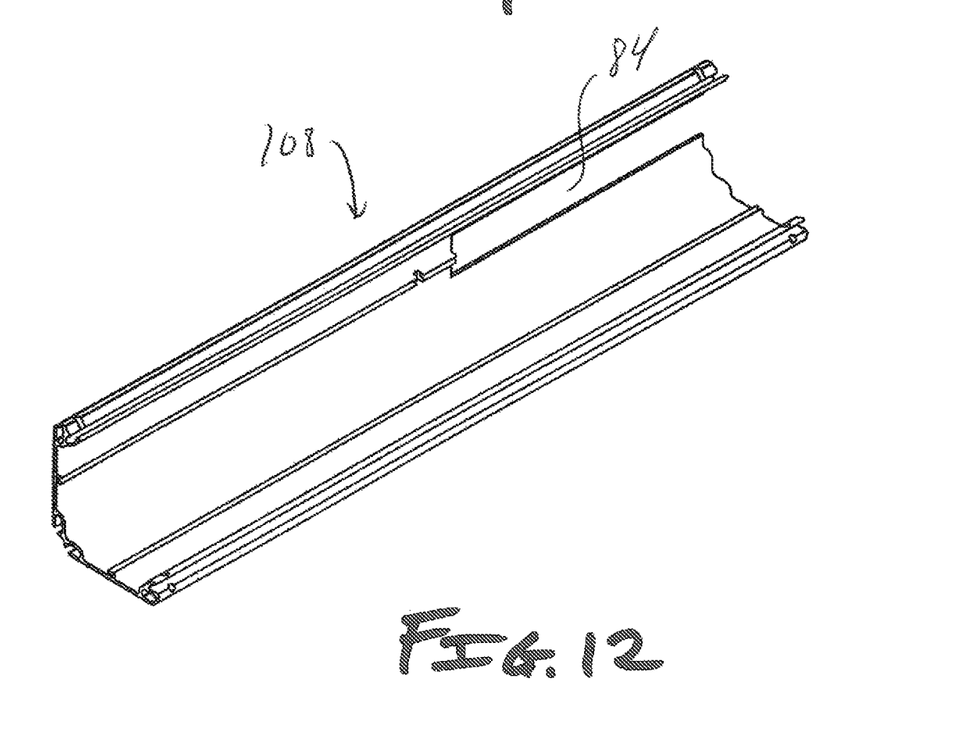
FIG. 12 is a perspective view of another portion of the post shown in FIG. 9.

FIGS. 11 and 12 show post portions 108 designed to interlock to form the post of one embodiment of the present invention. The post portions 108 are shown in more detail in FIGS. 13 and 14. Each post portion 104 is generally the same and comprised of a first plate 120 with the proximal end 124 and a distal end 130 and the $2^{nd}$ plate 134 with the proximal end 138 and a distal end 140. The proximal ends of the first plate 120 and the $2^{nd}$ plate 134 have arcuate members 144 that meet at a junction 150 that defines to grooves 154 that spanned at least a portion of the post length. Although the proximate ends of each plate are the same, the distal ends differ.

Figure 13:
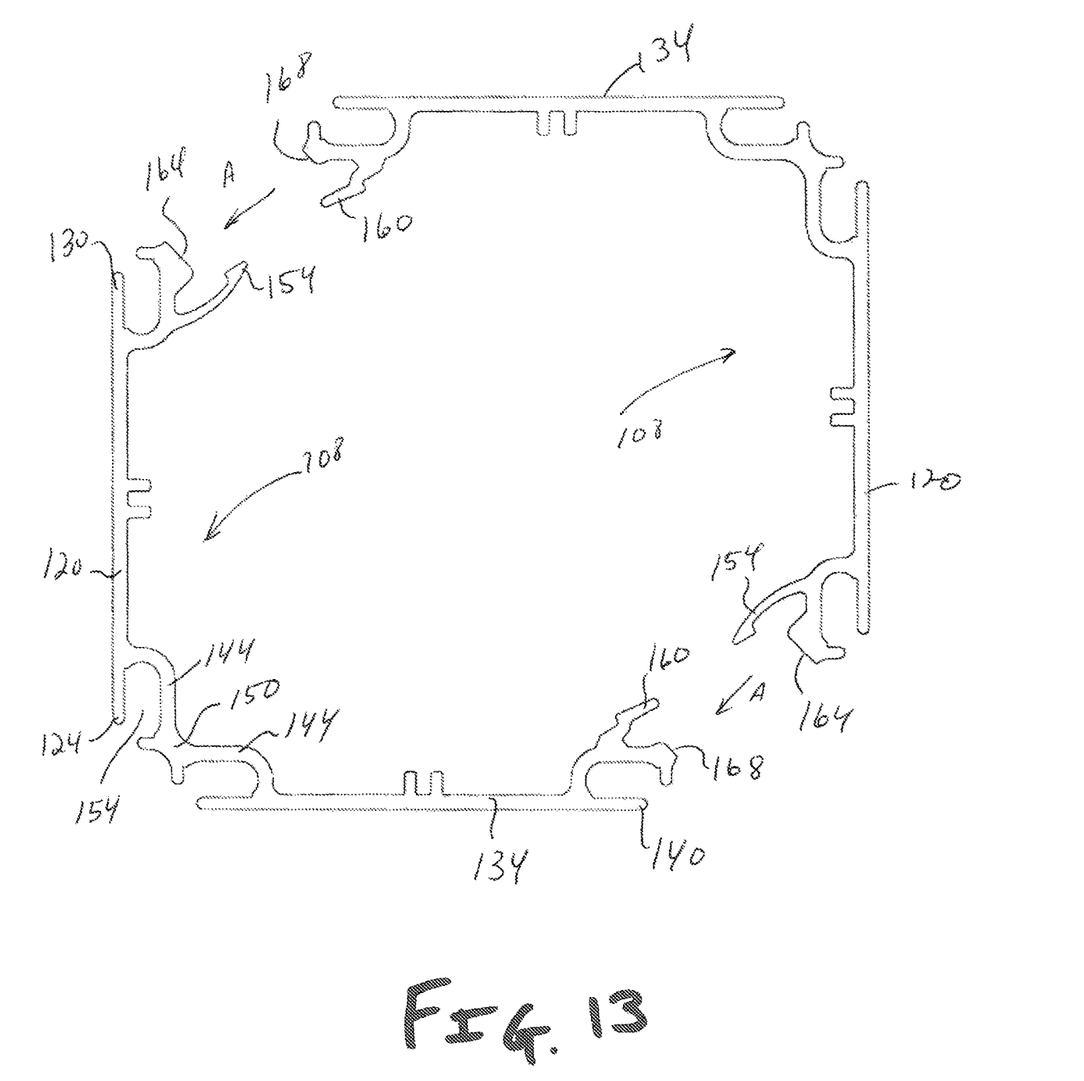
FIG. 13 is a top plan view of the post before adjacent portions are interconnected.
Figure 14:
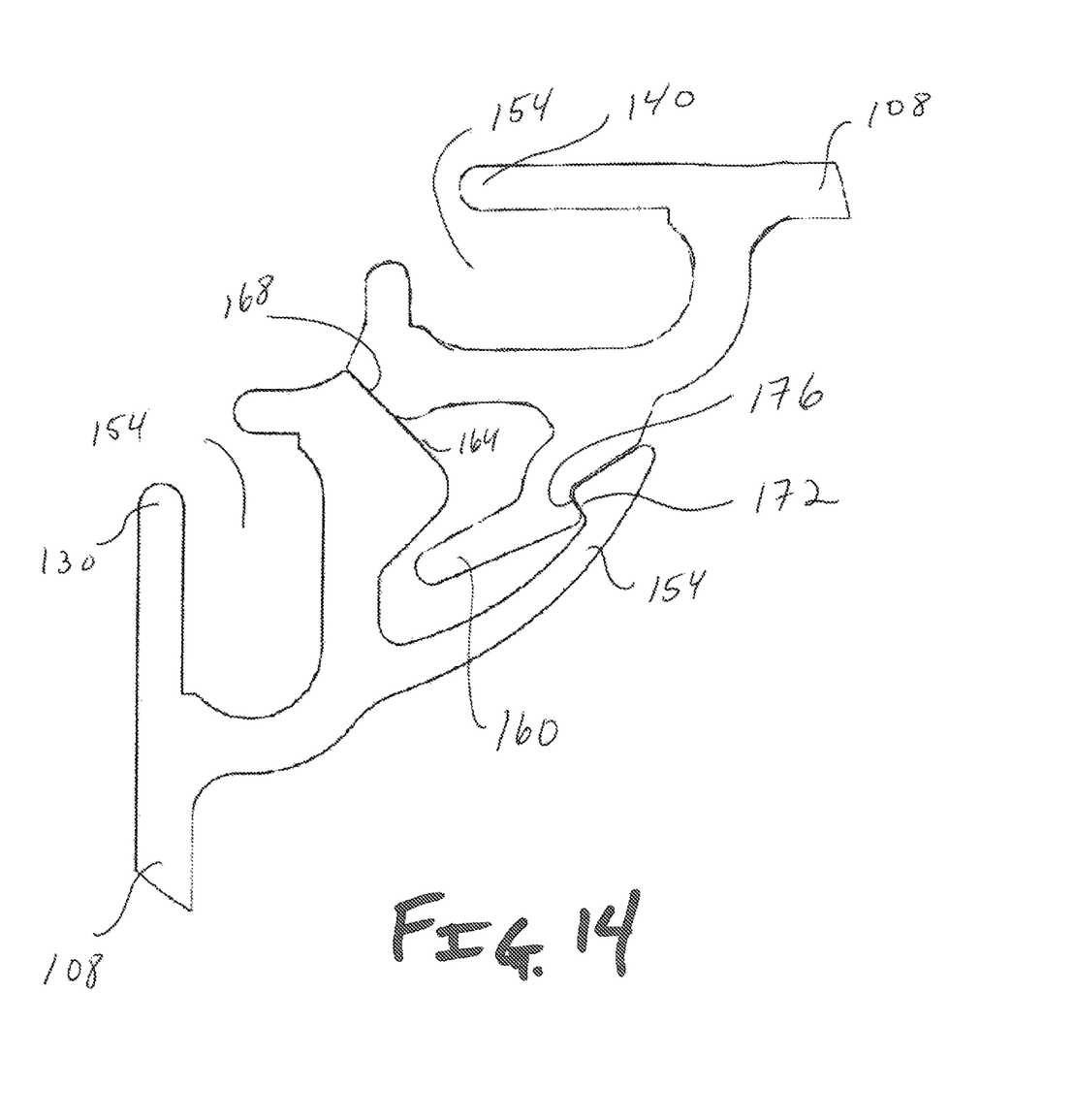
FIG. 14 is a detailed view illustrating the interconnection of adjacent post portions.

More specifically, with particular reference to FIG. 13, the distal end 130 of the first plate 120 includes an arcuate finger 154 and the distal end 140 of the $2^{nd}$ plate 134 includes an extent 160. The finger 154 is spaced from a face 160 associated with distal end 130. The extent 160 is spaced from a corresponding phase 168 of distal end 140. In operation, as shown in FIG. 14, the faces 164, 168 are engaged to form a structure similar to the junction found at the proximal end of the first and $2^{nd}$ plates. When interconnected, the extents 160 are located behind the fingers 154, which locks post portions together. A stop 172 on the finger 154 will engage as seat 176 on the extent 162 secure the two post portions. This marriage can be made by sliding post portions relative to each other along their longitudinal axes or by a motion indicated by arrow A in FIG. 13, wherein the finger 154 and the extent 160 deflect and relax to allow the faces to engage.

Figure 15:
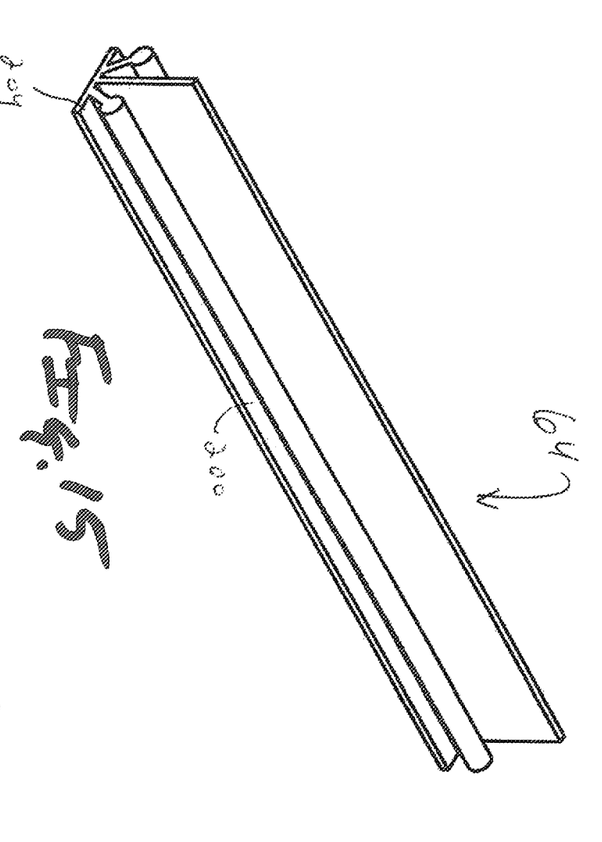
FIG. 15 is a perspective view of a rail connector.
Figure 16:
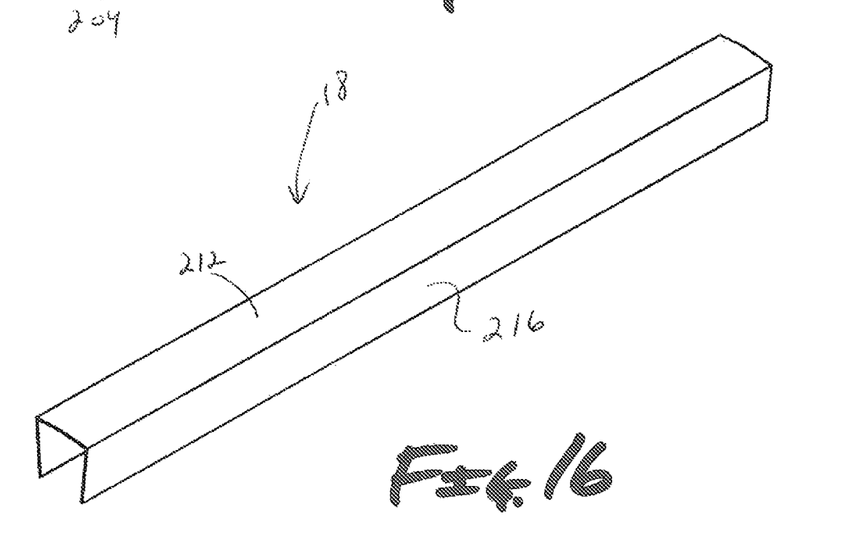
FIG. 16 is a perspective view of a data conduit.

FIG. 15 shows a rail connector 64 of one embodiment of the present invention that connects power rails to posts. The rail connector 64 has a planar surface 200 that accommodates orthogonally-oriented tendons 204 that have rail-shaped ends 208. The rails 208 span at least a portion of the length of the rail connector 64 in operation, the rails 208 are received within corresponding grooves of the post and rail assembly end plates.

FIG. 16 shows the data conduit 18 of one embodiment of the present invention. The data conduit is comprised of an outer wall 212 with sidewalls 216 that extend therefrom. Sidewalls 216 may be angled relative to each other such that the angle between the outer wall and the sidewalls is less than 90°. The ends of the sidewalls 216 are received within the grooves 68 in the upper plate 42 (see FIGS. 7 and 8). In one embodiment, the data conduit is substantially opaque. However, the data conduit, or portion thereof, may be clear so that one can see the cables running therethrough. Indeed, some embodiments provide lights that emanate from the data conduit or power rail for aesthetic purposes or for use during an emergency. Although the data conduit has been described as being configured to accommodate data/voice cables, one of ordinary skill in the art will appreciate that the volume provided by the data conduit is well-suited for storing other items such as memory devices, Wi-Fi signal boosters, etc.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A system for providing power and data cables, comprising:
    a power conduit comprised of an upper portion, a lower portion, a rear portion, and a selectively removable front plate;
    at least one bracket interconnected to the upper portion, the lower portion, or the rear portion of the power conduit, the at least one bracket configured to secure a power outlet or a voice/data connector;
    a first end plate selectively interconnected to first ends of the upper portion, the lower portion, and the rear portion, the first end plate also configured to receive a first end of the front plate;
    a second end plate selectively interconnected to second ends of the upper portion, the lower portion, and the rear portion, the second end plate also configured to receive a second end of the front plate;
    a data conduit having an upper surface with walls extending therefrom, wherein ends of the walls are configured to be selectively received within grooves in the upper portion;
    wherein at least one of the first end plate and the second end plate and the upper portion has at least one opening configured to accommodate power or voice/data cables;
    a first post interconnected to the first end plate with a first connector;
    a second post interconnected to the second end plate with a second connector;
    wherein the first post and the second post are comprised of a first post portion and a second post portion that possess at least one longitudinal opening configured to align with an opening in the first end plate and the second end plate, the first post portion and the second post portion further comprising;
        a first plate having a proximal end and a distal end, wherein a first end of a first arcuate member is interconnected a predetermined distance from the proximal end,
        a second plate having a proximal end and a distal end, wherein a first end a second arcuate member is interconnected a predetermined distance from the proximal end,
        wherein second ends of the first arcuate member and the second arcuate member are joined at a junction to define a first groove associated with the proximal end of the first plate and a second groove associated with the proximal end of the second plate, the first groove or the second groove configured to receive a portion of the first connector or the second connector,
        wherein the distal end of the first plate has an associated groove defined by a wall with a finger extending therefrom,
        wherein the distal end of the second plate has an associated groove defined by a wall with an extent interconnected thereto, and
        wherein the finger interconnects to an extent of a second plate of an adjacent post portion to form the first post and the second post; and
    wherein the first post and the second post have mounting brackets that interconnect to the lower portion, the mounting brackets positioning the power conduit such that the upper surface of the data conduit is generally aligned to upper surfaces of the first post and the second post.

2. The system of claim 1, wherein the power conduit is about 36 to about 72 inches long.

3. The system of claim 1, wherein the first post and the second post have ends adapted to contact a horizontal surface, and wherein the mounting brackets are interconnected to the first post and the second post at a location to position a bottom surface of the power conduit about 10 inches from the horizontal surface.

4. The system of claim 1, further comprising feet interconnected to ends of the first post and the second post.

5. The system of claim 1, wherein the front plate accommodates plates that interconnect to power outlets and voice/data outlets.

6. The system of claim 1, wherein the data conduit is clear.

7. The system of claim 1, wherein the data conduit includes lighting elements.

8. The system of claim 1, further comprising at least one of a data storage device, a modem, a WIFI repeater, a fan, an antenna, and a speaker.

9. The system of claim 1, further comprising an electromagnetic energy barrier positioned between the power conduit and the data conduit.

10. A system for providing power and data cables, comprising:
- a power conduit comprised of an upper portion, a lower portion, a rear portion, and a selectively removable front plate;
- a data conduit having an upper surface with walls extending therefrom, wherein ends of the walls are configured to be selectively received within grooves provided in the upper portion;
- a first post interconnected to a first end of the power conduit;
- a second post interconnected to a second end of the power conduit; and
- wherein the first post and the second post are comprised of a first post portion and a second post portion that possess at least one longitudinal opening configured to align with an opening in the first end plate and the second end plate, the first post portion and the second post portion further comprising:
  - a first plate having a proximal end and a distal end, wherein a first end of a first arcuate member is interconnected a predetermined distance from the proximal end,
  - a second plate having a proximal end and a distal end, wherein a first end of a second arcuate member is interconnected a predetermined distance from the proximal end,
  - wherein second ends of the first arcuate member and the second arcuate member are joined at a junction to define a first groove associated with the proximal end of the first plate and a second groove associated with the proximal end of the second plate, the first groove or second groove configured to interconnect to the first post or the second post,
  - wherein the distal end of the first plate has an associated groove defined by a wall with a finger extending therefrom,
  - wherein the distal end of the second plate has an associated groove defined by a wall with an extent interconnected thereto, and
  - wherein the finger interconnects to an extent of a second plate of an adjacent post portion to form the first post and the second post.

11. The system of claim 10, wherein the length of the power conduit is about 36 to about 72 inches long.

12. The system of claim 10, further comprising feet interconnected to ends of the first post and the second post.

13. The system of claim 10, wherein the front plate accommodates plates that interconnect to power outlets and voice/data outlets.

14. The system of claim 10, wherein the data conduit is clear.

15. The system of claim 10, wherein the data conduit includes lighting elements.

16. The system of claim 10, further comprising at least one of a data storage device, a modem, a WIFI repeater, a fan, an antenna, and a speaker.

17. The system of claim 10, further comprising an electromagnetic energy barrier positioned between the power conduit and the data conduit.

\* \* \* \* \*